United States Patent [19]
Itoi et al.

[11] Patent Number: 5,511,462
[45] Date of Patent: Apr. 30, 1996

[54] DIAPHRAGM ACTUATOR

[75] Inventors: Kenji Itoi; Akira Endo; Yosuke Okayasu, all of Gunma, Japan

[73] Assignee: Mitsuba Electric Manufacturing Co., Ltd., Gumma, Japan

[21] Appl. No.: 306,891

[22] Filed: Sep. 16, 1994

[30] Foreign Application Priority Data

Nov. 11, 1993 [JP] Japan ................................. 5-307317

[51] Int. Cl.⁶ ........................................................ F16J 3/02
[52] U.S. Cl. ........................................................... 92/99
[58] Field of Search ........................................................ 92/99

[56] References Cited

U.S. PATENT DOCUMENTS

| | | | |
|---|---|---|---|
| 2,976,686 | 3/1961 | Stelzer | 92/99 |
| 3,136,229 | 6/1964 | Bauman | 92/99 |
| 3,183,789 | 5/1965 | Stelzer | 92/99 |
| 5,076,142 | 12/1991 | Steer et al. | 92/99 |
| 5,249,508 | 10/1993 | Hasegawa et al. | 92/99 |

FOREIGN PATENT DOCUMENTS 102368  10/1916  United Kingdom .................. 92/99

*Primary Examiner*—F. Daniel Lopez
*Attorney, Agent, or Firm*—Marshall & Melhorn

[57] ABSTRACT

In a diaphragm actuator in which a central boss provided in a retainer plate is passed through a central opening of a diaphragm, to prevent any excessive stress or deformation developed in a freely deformable part of the diaphragm from being transmitted to the central opening fitted on the central boss, and adversely affecting the condition of coupling between them, a plurality of through holes are provided in the retainer plate so that, when vacuum is suddenly introduced into a vacuum chamber of the diaphragm actuator, the diaphragm is firmly secured to the retainer plate by suction produced by the through holes.

4 Claims, 1 Drawing Sheet

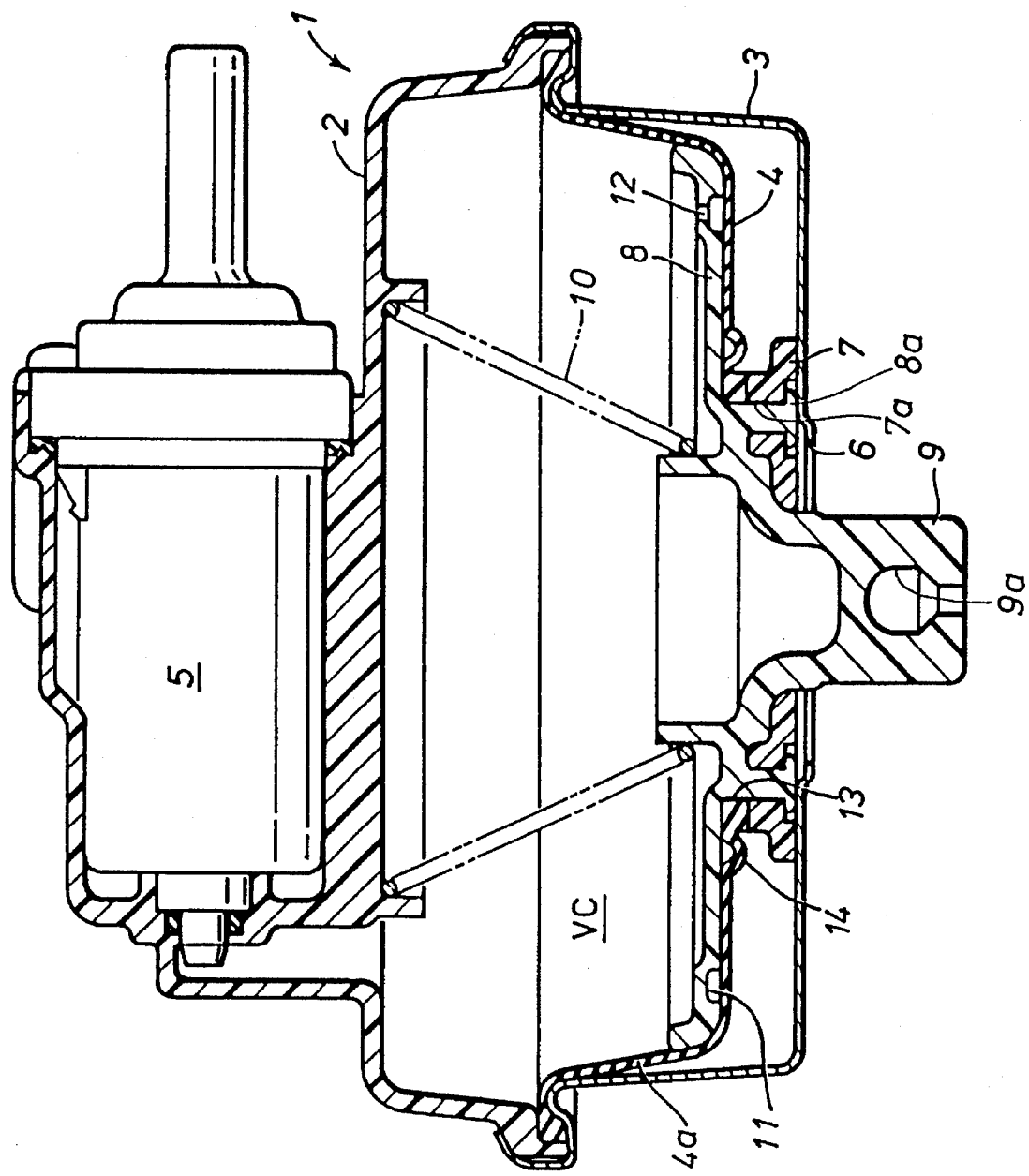

DIAPHRAGM ACTUATOR

TECHNICAL FIELD

The present invention relates to an improved diaphragm actuator, and in particular to a diaphragm actuator which is adapted to be actuated by engine vacuum.

BACKGROUND OF THE INVENTION

A diaphragm actuator widely used in automobiles for actuating on-board equipment such as a cruise control system normally comprises a pair of cup-shaped casing halves, and a diaphragm having its peripheral edge clamped between the casing halves, and separating the interior of the casing into two chambers, and a central part of the diaphragm is connected to an object to be actuated. Thus, by introducing a negative pressure into one of the chambers, a corresponding actuating force can be applied to the object to be actuated.

In such a diaphragm actuator, to simplify the manufacturing process and reduce the weight of the moving part of the actuator, an opening formed in a central part of the diaphragm is simply fitted onto a boss projecting from a central part of a disk-shaped retainer plate, and the object to be actuated is connected to the boss via suitable coupling means.

However, according to such a structure, when the pressure difference across the diaphragm abruptly increases, the object to be actuated may not be able to readily follow the deformation of the diaphragm due to inertia or frictional resistance. In such a case, a relatively large tension may be developed in the diaphragm, and the coupling between the central opening of the diaphragm and the boss of the retainer plate may be adversely affected. In an extreme case, the central opening may be stretched to such an extent that air may leak from one chamber to another via the central opening of the diaphragm. Also, if the diaphragm is excessively stretched, it may be folded up, and caught between an edge of the retainer plate and the adjacent wall of the actuator casing.

It is conceivable to securely clamp the diaphragm to a peripheral part of the retainer plate, but it will cause local stress in the part of the diaphragm adjacent to the clamped portion. And, because a substantial part of the diaphragm is constrained, the freedom of deformation of the diaphragm is restricted, and the durability of the diaphragm may be reduced.

Japanese utility model publication (kokai) No. 4-113304 discloses a diaphragm actuator designed to avoid such problems. To prevent excessive stretching of the diaphragm, an annular bulge and an annular bead having an increased thickness are arranged coaxially around the central opening. The annular bead having a substantially rectangular cross section is intended to prevent tensile stress from reaching the central region, and the annular bulge portion relieves the tension and accommodates deformation without causing creases in the diaphragm if it is transmitted beyond the annular bead.

However, this prior proposal only provides a partial solution to the problem, and a better solution to the problems has been desired.

BRIEF SUMMARY OF THE INVENTION

In view of such problems of the prior art, a primary object of the present invention is to provide an improved diaphragm actuator which is economical to manufacture, and reliable in use.

A second object of the present invention is to provide a diaphragm actuator which can ensure its diaphragm to operate in a stable fashion at all times.

According to the present invention, these and other objects can be accomplished by providing an improved diaphragm actuator, comprising: a casing including first and second cup shaped housing halves; a diaphragm including a peripheral part clamped between the casing halves, and a central opening, and defining at least one enclosed chamber in cooperation with the first casing half; conduit/valve means for selectively introducing negative pressure into the enclosed chamber; a disk-shaped retainer plate having a first major surface facing away from the enclosed chamber and engaging a surface of the diaphragm facing the enclosed chamber, and a central boss closely fitted into the central opening of the diaphragm; and coupling means provided at a free end of the central boss and adapted to be coupled to an object to be actuated; the retainer plate being provided with a plurality of through holes arranged around the central boss.

Because the vacuum introduced into the enclosed chamber applies a suction force, via the openings of the retainer plate, to the diaphragm which can effectively secure the diaphragm to the retainer plate, any excessive tension or deformation which may develop in a freely deformable part of the diaphragm is prevented from reaching the central opening. Thus, the diaphragm is favorably and temporarily restrained when necessary without creating any ill effect.

Preferably, the retainer plate is provided with a substantially concentric annular recess on the first major surface, and the through holes are provided at a bottom region of the annular recess. Thus, the vacuum suction can be distribute evenly over the entire circumference, and a stable securement of the diaphragm is made possible. By providing an annular bulge concentrically between the central opening and a part of the diaphragm corresponding to the through holes of the retainer plate, the stress and deformation of the part of the diaphragm between the central opening and the annular region adapted to be attached to the through holes can be favorably absorbed and accommodated.

According to a preferred embodiment, a peripheral edge of the central opening of the diaphragm consists of a bead having a relatively large thickness, and is clamped between the retainer plate and an annular clamp plate so that these two parts can be joined together both economically and in a stable fashion.

BRIEF DESCRIPTION OF THE DRAWINGS

Now the present invention is described in the following with reference to the appended drawing, in which:

FIG. 1 is a sectional view of a preferred embodiment of the diaphragm actuator according to the present invention.

DETAILED DESCRIPTION OF THE PREFERRED EMBODIMENTS

FIG. 1 illustrates a first embodiment of the diaphragm actuator according to the present invention. This actuator 1 comprises first and second cup-shaped casing halves 2 and 3 which are joined together at their open ends, and a peripheral part of a cup-shaped diaphragm 4 is interposed between the open ends of the casing halves 2 and 3, and is securely held between them by crimping the peripheral edge of the second casing half 3 onto the first casing half 2. The first casing half 2 is made of rigid synthetic resin material while the second casing half 3 is made of stamp-formed sheet metal such as steel. The diaphragm 4 is made of rubber or rubber-like synthetic resin material.

The vacuum chamber VC defined by the diaphragm 4 and the first casing half 2 is communicated with an intake manifold of an engine not shown in the drawing via a solenoid valve assembly 5 which selectively introduces and releases vacuum and outer air into and out of the vacuum chamber VC. A disk-shaped retainer plate 8 is secured to a central part of the diaphragm 4. The retainer plate 8 is provided with a central boss 9 which is passed through a central opening 13 of the diaphragm 4, and a plurality of projections 8a concentrically surrounding the central boss 9. An annular clamp plate 7 is fitted onto the central boss 9, and the projections 8a are also fitted into corresponding openings 7a provided in the annular clamp plate 7.

Thus, the peripheral edge of the central opening 13 of the diaphragm 4 is clamped between the retainer plate 8 and the clamp plate 7, and the projection 8a fitted into the openings 7a of the annular clamp plate 7 are suitable crimped (for instance, thermally or by using an ultrasonic crimping head). A central part of the second casing half 3 is provided with an opening 6, and the outer end of the central boss 9 projects out of the opening 6. The opening 6 also communicates the chamber defined between the diaphragm 4 and the second casing half 6 to the atmosphere. The outer end of the central boss 9 is provided with a recess 9a adapted to engage a rod not shown in the drawing connected to an object to be actuated. A conical compression coil spring 10 is interposed between the first casing half 2 and the opposing surface of the retainer plate 8 to urge the retainer plate 8 away from the vacuum chamber VC.

According to this diaphragm actuator 1, when intake vacuum is introduced into the vacuum chamber VC, the diaphragm 4 is displaced against the spring force of the conical spring 10 in the direction to reduce the volume of the vacuum chamber VC. The resulting movement of the retainer plate 8 causes the boss 9 to pull a rod (not shown in the drawing) connected to an object to be actuated. In other words, the introduction of vacuum into the vacuum chamber VC causes the retainer plate 8 to move upward as seen in FIG. 1. When the vacuum is switched off and atmospheric pressure is introduced into the vacuum chamber VC by suitably activating the solenoid valve assembly 5, the retainer plate 8 is moved outwardly or downward as seen in FIG. 1 under the spring force of the conical spring 10. Thus, by suitably controlling 10 the solenoid valve assembly 5 and introducing engine vacuum or atmospheric air into the vacuum chamber VC, the retainer plate 8 or the central boss 9 can be moved in either direction.

The retainer plate 8 is provided with an annular recess 11 in a concentric manner over its entire circumference on its surface abutting the diaphragm 4. A plurality of through holes 12 are passed through the diaphragm 4 at the bottom of the annular recess 11 at a regular interval.

Along the peripheral edge of the central opening 13 of the diaphragm 4 is provided a bead having a relatively large thickness, and this bead is clamped between the retainer plate 8 and the clamp plate 7. An annular bulge 14 is formed around the bead likewise in a concentric fashion. In this embodiment, the annular bulge 14 consists of a section having a relatively uniform thickness, and bulging away from the retainer plate 8 by a height substantially equal to the thickness of the diaphragm 4. Thus, the annular bulge 14 faces its convex surface away from the vacuum chamber VC.

According to a conventional diaphragm actuator, for instance, when the vacuum chamber is rapidly depressurized, the object to be actuated may not be able to follow the displacement of the diaphragm due to inertia, frictional resistance or other reasons. In such a case, the freely deformable part 4a of the diaphragm 4 or the annular part of the diaphragm 4 between the periphery of the retainer plate 8 and the outer periphery of the diaphragm 4 clamped between the casing halves 2 and 3 tends to be excessively drawn toward the vacuum chamber VC, and excessive tension may develop in the diaphragm 4. As a result, the central opening 13 of the diaphragm 4 may be stretched to such an extent, leakage may be developed in the central opening 13. Also, the freely deformable part 4a may be so deformed that it may be caught between the outer periphery of the retainer plate 8 and the surrounding wall of the first casing half 2.

To overcome this problem, according to the present invention, an annular recess 11 is provided in the surface of the retainer plate 8 which is normally in contact with the diaphragm 4, and a plurality of holes 12 are provided at the bottom of the annular recess 11. Thus, when vacuum is introduced into the vacuum chamber VC, vacuum suction is created in the annular recess 11, and the diaphragm 4 is firmly secured to the retainer plate 8 along the annular recess 11. As a result, the tension acting on the freely deformable part 4a of the diaphragm 4 is prevented from being transmitted to the region adjacent to the central opening 13, and the condition of the coupling between the central boss 9 and the central opening 13 of the diaphragm 4 is prevented from being affected by possible excessive tension in the freely deformable part 4a. Furthermore, the annular bulge 14 accommodates any deformation which might be caused by the excessive deformation of the freely deformable part 4a and or the excessive suction applied from the annular recess 11.

Because the attachment of the diaphragm to the retainer plate 8 by the suction produced at the annular recess 11 is temporary in nature, the entire volume of the diaphragm 4 is available for deformation most of the time, and no localized force is need to be applied to the diaphragm, for instance, for clamping purpose, the durability of the diaphragm is in no way reduced by the adoption of the present invention. As there is no need to permanently clamp the diaphragm to the retainer plate, not only the stress to the diaphragm is reduced but also the fabrication cost would not be increased.

Although the present invention has been described in terms of a specific embodiment thereof, it is possible to modify and alter details thereof without departing from the spirit of the present invention.

What we claim is:

1. A diaphragm actuator, comprising:

a casing including first and second cup shaped housing halves;

a diaphragm including a peripheral part clamped between said casing halves, and a central opening having an inner peripheral edge, said diaphragm defining at least one enclosed chamber in cooperation with said first casing half;

conduit/valve means for selectively introducing negative pressure into said enclosed chamber;

a disk-shaped retainer plate having a first major surface facing away from said enclosed chamber and engaging a surface of said diaphragm facing said enclosed chamber, and a central boss closely fitted into said central opening of said diaphragm;

an annular clamp plate fitted onto the central boss of said retainer plate for clamping the peripheral edge of the central opening of said diaphragm between said retainer plate and said annular clamp;

an annular recess substantially concentric to the central boss on the first major surface of said retainer plate;

coupling means provided at a free end of said central boss and adapted to be coupled to an object to be actuated;

a plurality of through holes formed in said retainer plate at a bottom region of the annular recess arranged around said central boss; and an annular bulge formed in said diaphragm arranged concentric to the central opening and positioned between the central opening and a part of the diaphragm corresponding to said through holes in said retainer plate.

2. The diaphragm actuator according to claim 1, wherein said peripheral edge of said diaphragm consists of a bead having a relatively large thickness.

3. A diaphragm actuator having a diaphragm and a retainer plate with improved sealing and tension distribution capabilities, said actuator comprising:

a casing including first and second cup shaped housing halves;

a diaphragm including a peripheral part clamped between said casing halves, and a central opening, and defining at least one enclosed chamber in cooperation with said first casing half;

conduit/valve means for selectively introducing negative pressure into said enclosed chamber;

a disk-shaped retainer plate having a planar first major surface facing away from said enclosed chamber and continuously engaging a surface of said diaphragm facing said enclosed chamber, and a central boss closely fitted into said central opening of said diaphragm;

a plurality of through holes formed in said retainer plate and arranged annularly and concentrically about the central boss, said through holes extending from the enclosed chamber through the planar first major surface to the surface of said diaphragm;

an annular recess substantially concentric to the central boss on the first major surface of said retainer plate for interconnecting said plurality of through holes such that a pressure decrease in the enclosed chamber is uniformly transmitted through said recess to said diaphragm for securing said diaphragm to said retainer plate; and coupling means provided at a free end of said central boss and adapted to be coupled to an object to be actuated.

4. A diaphragm actuator having a diaphragm and a retainer plate with improved sealing and tension distribution capabilities, said actuator comprising:

a casing including first and second cup shaped housing halves;

a diaphragm including a peripheral part clamped between said casing halves, and a central opening, and defining at least one enclosed chamber in cooperation with said first casing half;

conduit/valve means for selectively introducing negative pressure into said enclosed chamber;

a disk-shaped retainer plate having a planar first major surface facing away from said enclosed chamber and continuously engaging a surface of said diaphragm facing said enclosed chamber, and a central boss closely fitted into said central opening of said diaphragm;

a plurality of through holes formed in said retainer plate and arranged around the central boss, said through holes extending from the enclosed chamber through the planar first major surface to the surface of said diaphragm;

an annular recess substantially concentric to the central boss on the first major surface of said retainer plate for interconnecting said plurality of through holes such that a pressure decrease in the enclosed chamber is uniformly transmitted through said recess to said diagram for securing said diaphragm to said retainer plate;

an annular bulge formed in said diaphragm arranged concentric to the central opening and positioned between the central opening and a pare of the diaphragm corresponding to said through holes in said retainer plate; and coupling means provided at a free end of said central boss and adapted to be coupled to an object to be actuated.

* * * * *